(12) United States Patent
Sohr et al.

(10) Patent No.: US 12,509,383 B2
(45) Date of Patent: *Dec. 30, 2025

(54) METHOD FOR PREPARING AND/OR PERFORMING THE SEPARATION OF A SUBSTRATE ELEMENT AND SUBSTRATE SUB-ELEMENT

(71) Applicant: SCHOTT AG, Mainz (DE)

(72) Inventors: David Sohr, Mainz (DE); Fabian Wagner, Mainz (DE); Andreas Ortner, Gau-Algesheim (DE)

(73) Assignee: SCHOTT AG, Mainz (DE)

( * ) Notice: Subject to any disclaimer, the term of this patent is extended or adjusted under 35 U.S.C. 154(b) by 792 days.

This patent is subject to a terminal disclaimer.

(21) Appl. No.: 17/195,197

(22) Filed: Mar. 8, 2021

(65) Prior Publication Data

US 2021/0276133 A1 Sep. 9, 2021

(30) Foreign Application Priority Data

Mar. 6, 2020 (DE) ........................ 10 2020 106158.7
Sep. 4, 2020 (DE) ...................... 10 2020 123 186.5

(51) Int. Cl.
| | | |
|---|---|---|
| *C03B 33/02* | (2006.01) | |
| *B23K 26/06* | (2014.01) | |
| *B23K 26/0622* | (2014.01) | |
| *B23K 26/073* | (2006.01) | |
| *B23K 26/146* | (2014.01) | |

(Continued)

(52) U.S. Cl.
CPC ...... *C03B 33/0222* (2013.01); *B23K 26/0622* (2015.10); *B23K 26/0624* (2015.10); *B23K 26/0626* (2013.01); *B23K 26/0738* (2013.01); *B23K 26/146* (2015.10); *B23K 26/40* (2013.01); *B23K 26/402* (2013.01); *B23K 26/53* (2015.10);

(Continued)

(58) Field of Classification Search
CPC ............ C03B 33/0222; B23K 26/0622; B23K 26/0624; B23K 26/0626; B23K 26/0738; B23K 26/146; B23K 26/40; B23K 26/402; B23K 26/53; B23K 26/57; B23K 2103/54; H01L 21/78
See application file for complete search history.

(56) References Cited

U.S. PATENT DOCUMENTS 10,280,108 B2  5/2019  Bohme
10,620,444 B2  4/2020  Kumkar
(Continued)

FOREIGN PATENT DOCUMENTS

CN  107428588  12/2017
CN  107848860  3/2018
(Continued)

OTHER PUBLICATIONS en.wikipedia.org/wiki/Sapphire (Year: 2019).*

*Primary Examiner* — Steven W Crabb
*Assistant Examiner* — Fahmida Ferdousi
(74) *Attorney, Agent, or Firm* — Ruggiero McAllister & McMahon LLC

(57) ABSTRACT

The present disclosure relates to a method for preparing and/or performing the separation of a substrate element into at least two substrate sub-elements along a separation face and a substrate sub-element which is manufactured and/or can be manufactured in particular by use of the method according to the disclosure.

23 Claims, 10 Drawing Sheets

(51) Int. Cl.

| | |
|---|---|
| *B23K 26/40* | (2014.01) |
| *B23K 26/402* | (2014.01) |
| *B23K 26/53* | (2014.01) |
| *B23K 26/57* | (2014.01) |
| *B23K 103/00* | (2006.01) |
| *H01L 21/78* | (2006.01) |

(52) U.S. Cl.
CPC .......... *B23K 26/57* (2015.10); *B23K 2103/54* (2018.08); *H01L 21/78* (2013.01)

(56) References Cited

U.S. PATENT DOCUMENTS

| | | | |
|---|---|---|---|
| 10,830,943 | B2 | 11/2020 | Li |
| 11,130,701 | B2 | 9/2021 | Akarapu |
| 2013/0192305 | A1 | 8/2013 | Black |
| 2013/0221053 | A1 | 8/2013 | Zhang |
| 2013/0291598 | A1 | 11/2013 | Saito |
| 2015/0165548 | A1 | 6/2015 | Marjanovic et al. |
| 2015/0166391 | A1 | 6/2015 | Marjanovic |
| 2015/0166393 | A1 | 6/2015 | Marjanovic |
| 2015/0299018 | A1 * | 10/2015 | Bhuyan .................. B23K 26/40 65/29.18 |
| 2017/0203994 | A1 | 7/2017 | Chen et al. |
| 2017/0252859 | A1 | 9/2017 | Kumkar et al. |
| 2018/0022631 | A1 | 1/2018 | Förtsch |
| 2018/0093914 | A1 * | 4/2018 | Akarapu ............ B23K 26/0608 |
| 2018/0134604 | A1 | 5/2018 | Ortner |
| 2018/0147819 | A1 | 5/2018 | Miyamoto |
| 2018/0221988 | A1 | 8/2018 | Liu et al. |
| 2018/0297887 | A1 | 10/2018 | Spier |
| 2018/0345419 | A1 | 12/2018 | Mikutis |
| 2018/0370840 | A1 | 12/2018 | Plapper |
| 2019/0002328 | A1 | 1/2019 | Lezzi et al. |
| 2019/0300417 | A1 | 10/2019 | Stute |
| 2019/0382300 | A1 | 12/2019 | Bui |
| 2020/0017407 | A1 | 1/2020 | Bello et al. |
| 2020/0254567 | A1 | 8/2020 | Genier |
| 2020/0376603 | A1 | 12/2020 | Kluge et al. |
| 2020/0388538 | A1 * | 12/2020 | Swoboda ................ C30B 33/00 |

FOREIGN PATENT DOCUMENTS

| | | |
|---|---|---|
| CN | 107848861 | 3/2018 |
| CN | 108367962 | 8/2018 |
| CN | 108698900 | 10/2018 |
| CN | 109623171 | 4/2019 |
| DE | 102018126381 | 8/2019 |
| EP | 2781296 | 9/2014 |
| JP | 2017509568 | 4/2017 |
| JP | 2018012613 A | 1/2018 |
| WO | 2016154284 | 9/2016 |
| WO | 2017030112 A1 | 2/2017 |

* cited by examiner

METHOD FOR PREPARING AND/OR PERFORMING THE SEPARATION OF A SUBSTRATE ELEMENT AND SUBSTRATE SUB-ELEMENT

CROSS-REFERENCE TO RELATED APPLICATION

The present application claims the benefit of German Patent Application No. 10 2020 106 158.7, filed on Mar. 6, 2020, and German Patent Application No. 10 2020 123 186.5, filed on Sep. 4, 2020, each of which is incorporated by reference.

BACKGROUND OF THE DISCLOSURE

1. Field of the Disclosure

The present disclosure relates to a method for preparing and/or performing the separation of a substrate element into at least two substrate sub-elements along a separation face. The present disclosure also relates to a substrate sub-element which is manufactured and/or can be manufactured by use of the method according to the disclosure.

2. Discussion of the Related Art

In glass production and processing, as well as in related areas, it is regularly necessary to separate substrate elements, such as glass elements, in particular glass plates, along a precisely defined separation face. Maintaining a previously defined course of the separation face is of great importance, for example, for the intercompatibility of the substrate sub-elements obtained after separation with other components.

In addition to a clean separation face, specifications often also require high strength of the separation face, i.e. the edge. The reason for this is that substrate sub-elements, such as in particular glass sub-elements, the separation face of which has a high degree of strength, are overall less sensitive to external influences. In this way it can, to a certain extent, wholly or at least partially be prevented that external damages to the interface occur at all and that any defects that may be present propagate into the interior of the material.

Current methods for carrying out a separation process are, for example, thermal laser beam separation (TLS), that are for example by use of a $CO_2$ laser, mechanical scribing, laser scribing or laser-based thermal cutting (laser based thermal shock cutting). The latter aims to continue an initial crack in the substrate element by means of thermomechanical stresses, typically generated by a $CO_2$ laser. What all these methods have in common, however, is that with them the course of the cracks in the material cannot be controlled or can only be controlled insufficiently.

In the method of laser perforation, individual regions of the substrate element to be separated are removed along the desired separation face by means of a laser in the frame of an ultrashort pulse laser (USP) process.

FIG. 1a shows a prior art substrate body in a plan view and FIG. 1b shows the same situation in a cross-sectional view perpendicular to the view in FIG. 1a. FIGS. 1a and 1b show a substrate element, which comprises a substrate body 3, in which the substrate body 3 comprises a substrate material. For example, the substrate element 1 can be a glass element, the substrate body 3 can be a glass body and the substrate material can be glass. The substrate element 1 is to be prepared to be able to be separated along a separation face which in FIG. 1b lies in the plane of the drawing and which extends through the center points of circular cavities 5. For this purpose, a USP laser system is often used for laser perforation, which generates a line focus 7 in the substrate material. The substrate material can thus be removed at the desired locations in order to produce the cavities 5 or hollow spaces as perforation holes in the substrate element 1 or the substrate body 3.

The preprocessed substrate element 1 is then finally separated, for example by mechanical crushing or by cleaving along the perforation line formed by the perforation holes.

It has been shown, however, that the course of the crack line and thus the course of the separation face in the substrate material can only be controlled with difficulty with this method. It has been observed that when crushing, the crack line can deviate from the perforation line and can extend away therefrom, which can lead to a separation face that does not correspond to the actually desired course. The force required for crushing is also often comparatively high. And the higher the force required, the more likely the crushing process itself will cause new damages to the substrate material.

To a certain extent, the course of the separation face can be made better controllable by increasing the number of perforation holes along the separation face, thus reducing the distance between adjacent cavities. As a result, the required crushing force can be reduced, too. However, counterintuitively, it can be seen that once the distance between the cavities falls below a certain value, the force required for subsequent crushing no longer decreases, but, on the contrary, increases again. This often goes hand in hand with a cancellation of the line focus at least at times and/or section-wise, so that no cavities are generated at times or section-wise. Moreover, control over the crushing process also decreases. This places a limit on a further reduction in the distance below a certain value. This value corresponds approximately to ten times the maximum extension of the cavity in a cross-sectional plane perpendicular to the main extension direction of the cavity.

It has also been found that the substrate sub-elements separated along the perforation line often have a separation face (edge) which is only of low strength.

During the perforation process, (micro) cracks form in the substrate material around the cavities. In addition to the basically desired cracks, which are located within the desired separation area and support the later separation process, cracks with other orientations also develop. The latter represent a preliminary damage to the substrate element and later lead to a lower edge strength of the separated substrate sub-elements. A suitable choice of laser parameters depending on the material properties can in principle influence the extent of this and other material damages. For example, the number and the length of the cracks can be controlled to a certain extent. However, a compromise has to be made between later separability and previous damage.

In other words, the conventional situation can also be described as follows: Due to the non-linear interaction of a USP laser pulse with the substrate material along the focal line, a microchannel (diameter often less than 1 μm) is created in the substrate, wherein the substrate material is pressed in the interior in the edge areas of the channel and thus leads there to a compression. Microcracks appear around the channel in the radial direction (depending on the pulse power). If a burst pulse is used (i.e. the channel is hit by several pulses within a short period of time), the area around the channel is damaged by a large number of longer microcracks. If the pitch, i.e. the distance between adjacent microchannels, is large compared to the hole diameter and the length of the microcracks, then adjacent microchannels can be generated without optical and mechanical influence by their respective precursors. As the pitch decreases, part of the beam energy is initially shadowed by the previously generated microchannel, which influences the formation of the current microchannel. Furthermore, if the pitch is further reduced, the remaining web material between the currently emerging microchannel and its adjacent precursor is weakened by the two adjacent micro crack systems in such a way that the web crushes and the material is pressed into the previously created microchannel where it melts again or agglutinates the previous channel again due to the high power densities. A perforation line with a short pitch produced in this way therefore has a significantly poorer separability than would actually be expected by an unbiased observer.

SUMMARY OF THE DISCLOSURE

It is an object of the present disclosure to provide a method whereby substrate elements can be separated in a simple, but nevertheless safe and reliable manner, or the separation can be prepared so that the course of the separation face is predeterminable as precisely as possible and any effort required for crushing is as low as possible. At the same time, the edge strength in the substrate sub-elements should also be improved.

It is also an object of the present disclosure to provide a substrate sub-element which comprises side surfaces (edges) with a high degree of strength.

These and other objects are addressed by a method of the present disclosure, namely a method for preparing and/or performing the separation of a substrate element into at least two substrate sub-elements along a separation face. The method comprises the steps of providing the substrate element, wherein the substrate element comprises a substrate body and wherein the substrate body comprises a substrate material, and controlling a line focus in the substrate body so that the substrate material of the substrate body is at least locally removed and/or displaced along the separation face at least section-wise. The line focus represents a focus of a light beam. The light beam is formed at least in the area of the line focus in the form of a light beam with an asymmetrical beam supply.

The present disclosure also provides a substrate sub-element, that is manufactured by the above-described method. The substrate sub-element comprises a body which comprises a glass material, glass ceramic material, and/or silicon, and has a side face. The side face has at least section-wise a height-modulated surface. The side face also has at least section-wise a surface roughness and a variation of the surface as a result of the surface roughness is between 1 and 5 orders of magnitude less than a variation of the surface as a result of the height modulation.

DETAILED DESCRIPTION OF THE DISCLOSURE

Figure 1A:
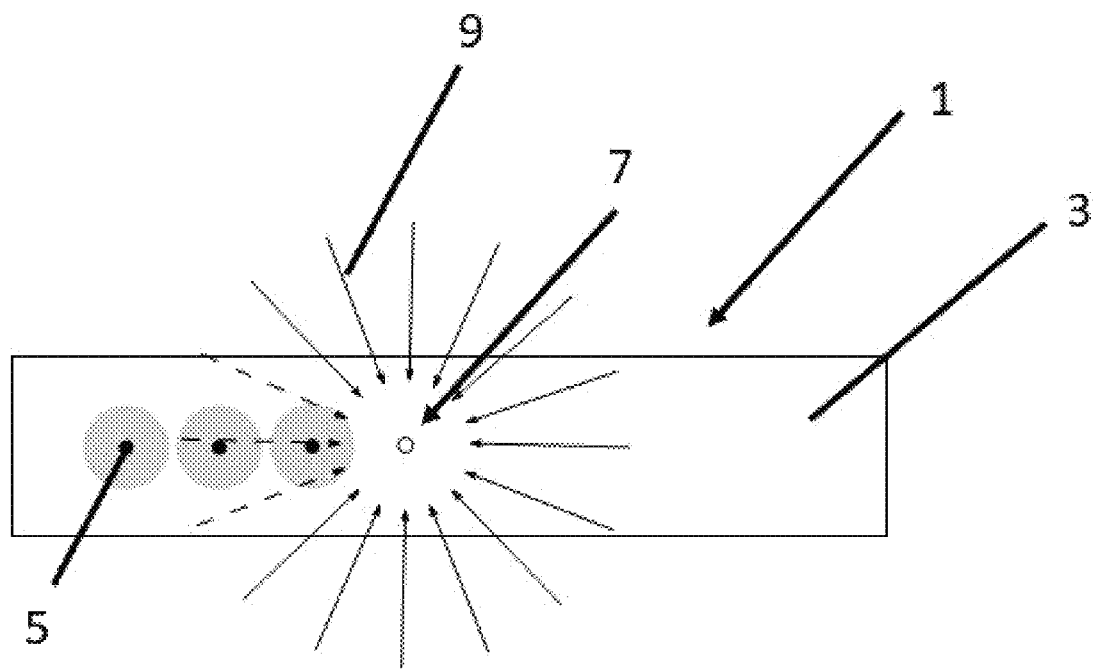
FIG. 1a shows a processed substrate body of the prior art in a plan view.
Figure 1B:
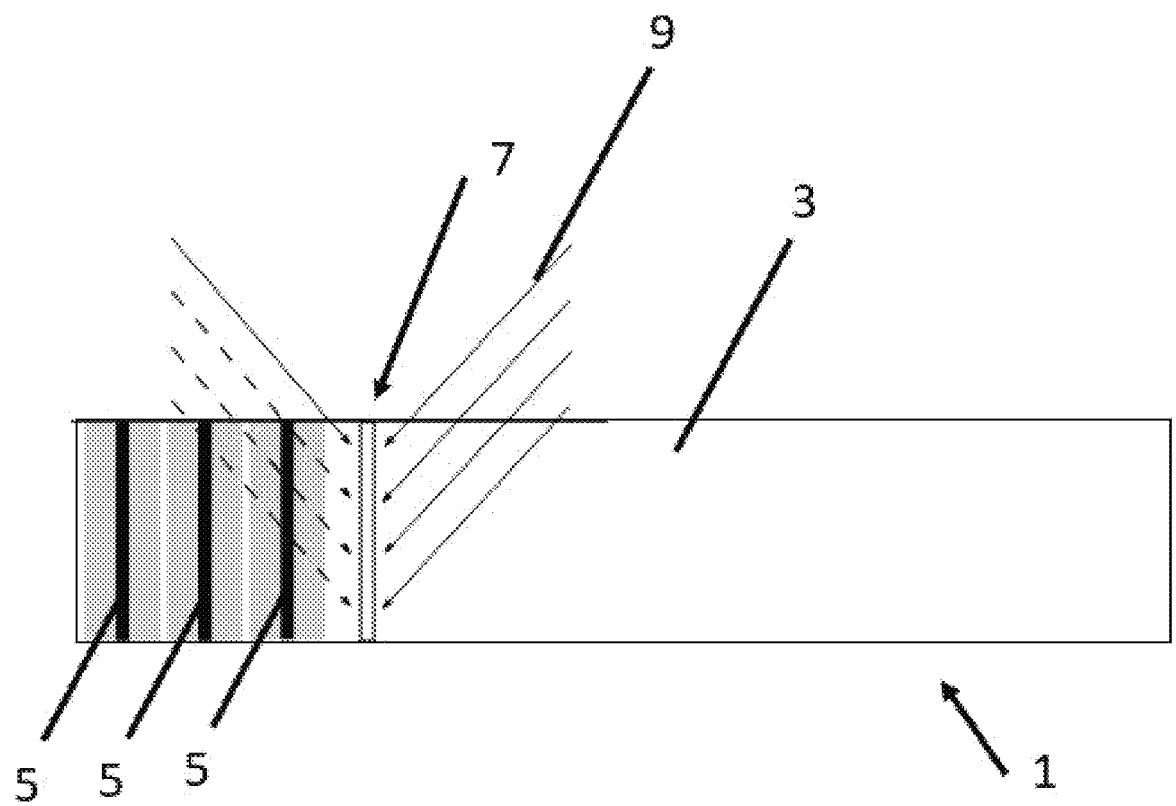
FIG. 1b shows a processed substrate body of the prior art in a cross-sectional view.

The disclosure is based on the surprising finding that cavities can be formed reliably and with a uniformly high quality within/in the substrate material if the light beam is not influenced by cavities that have already been formed. The inventors recognized that such an influence from directly adjacent cavities can be prevented particularly effectively by reducing or completely eliminating those lateral components of the light beam used which otherwise "collide" with the cavities already formed. Due to the large numerical equipment with conventional line foci, the partial beams regularly have significant lateral components and thus there is a correspondingly high "risk of collision".

According to the inventive teaching, a light beam with asymmetrical beam supply fulfills the property of reduced or eliminated lateral partial beams in a particularly simple and effective manner. For this purpose, the energy is no longer supplied to the focal line in a rotationally symmetrical manner along a conical surface (for example by means of beam-shaping optics), but rather asymmetrically. In other words, the light beam is shaped in such a way that, in contrast to conventionally used light beams, it does not have any components which can coincide with the cavities that have already been formed. This can ensure that the light beam remains largely unaffected by cavities that have already been formed and thus a perforation line of particularly high quality can be formed, since the line focus can be formed with a consistently high quality over the entire thickness range of the substrate element.

In connection with the beam supply or energy supply, the term "asymmetrical" is understood here in the sense of "non-rotationally symmetrical". This means that other symmetries are not excluded. For example, the Airy beam has a mirror plane parallel to the plane in which its curved course lies.

The proposed method contributes in a particularly intelligent way to an improved separation process and result or to the preparation of the separation, since both a significantly improved control of the course of the separation face is achieved with a reduced crushing force and the edge strength is improved.

At the same time, the method according to the disclosure can be realized by use of conventional means and thus integrated into existing facilities without any problems. In particular, processes for cutting substrate plates to size and produce substrate plate cutouts can be operated particularly efficiently and with particularly good results.

The disclosure therefore made it possible, preferably, that substrate elements, in particular transparent and/or brittle substrate elements, such as glass elements, in particular glass plates or glass panes, glass ceramic elements, in particular glass ceramic plates or glass ceramic panes, and/or silicon elements, in particular silicon wafers, even with great thicknesses from 0.6 mm, in particular with a thickness of between 0.6 mm and 10 mm, preferably between 0.6 mm and 5 mm or between 3 mm and 5 mm, even more preferably between 0.6 mm and 3 mm, even more preferably between 0.6 mm and 2 mm, or most preferably between 0.6 mm and 1.5 mm, can be separated or prepared therefor. As an alternative or in addition, the substrate elements have a thickness which is greater than 1 mm, greater than 5 mm or greater than 10 mm. For example, the substrate elements can have a thickness of 1 mm up to 50 mm, from 1 mm up to 40 mm, from 1 mm up to 30 mm, from 1 mm up to 20 mm or from 1 mm up to 15 mm. In addition, with the disclosure it is decisively possible to separate the substrate elements with only a few passes (i.e. relative displacements from substrate element to laser), for example between 2 and 10 passes, but also with just a single pass, or to prepare them therefor. This enables a very efficient process.

Here, the method can generally be applied to transparent, brittle substrate elements such as glass, glass ceramic, silicon and sapphire. This makes the method particularly universally.

In other words, the method according to the disclosure makes it possible in principle to process substrate elements in a first step by producing modifications such as perforations, i.e. for example tubular channels. In a further step, the glass element can either be separated by applying mechanical and/or thermal stresses in the material or a closed inner/outer contour can be generated. Inner contours are preferably produced by an etching process. In principle, outer contours can also be produced, for example by subsequent etching. Generally speaking, the methods used in the further step connect the channels created in the first step, for example either by cracks or by removing material.

The person skilled in the art understands that in the case of an asymmetrical beam there is an asymmetrical arrangement of the partial beams, but of course, generally several beam paths are not used for the asymmetrical beam supply.

Here, the person skilled in the art understands that the line focus must basically be formed within/in the substrate body. This includes situations in which the line focus is formed completely within the substrate body, that is to say no line focus is formed outside the substrate body. The line focus is then preferably formed up to the surface of the substrate body within the substrate body, or the line focus is formed up to a certain distance, for example a distance of up to 2 μm, up to 1 μm or up to 0.5 μm, to the respective surface within the substrate body. However, of course, cases are included in which the line focus is indeed formed within the substrate body, but also extends outside it. In fact, this is actually a preferred case.

If substrate material of the substrate body is at least locally removed and/or displaced along the separation face, at least section-wise, this is preferably done by the line focus. In other words, by controlling the line focus within the substrate body, the line focus removes or displaces substrate material of the substrate body at least section-wise along the separation face.

In preferred embodiments, the substrate element represents or comprises a glass element in the form of a glass pane.

The person skilled in the art understands that if something takes place "along" the separation face, for example the removal of substrate material of the substrate body, the separation face does not necessarily have to be completely present at the point in time, since it is only completely formed after the separation of the substrate element into the two substrate sub-elements. Instead, this is the planned separation area.

Therefore, in preferred embodiments, the method can also alternatively or additionally comprise the step: determining a planned separation face of the substrate element.

Everything that relates to the separation face in the substrate element that has not yet been separated then relates to the planned separation face. For example, the control of the line focus then includes that substrate material of the substrate body is at least locally removed and/or displaced along the planned separation face at least section-wise.

With the proposed method, the course of the crack line and thus the course of the separation face in the substrate material can be controlled particularly reliably. The required crushing force can also be reduced, which avoids further damage when crushing. Because the individual cavities can be positioned closer together. The strength of the separation face can also be increased, especially since fewer or even no microcracks are introduced by the method.

Alternatively or in addition, it can also be provided that with the asymmetrical beam supply (i) the energy is supplied asymmetrically and is preferably designed such that the centroid-of-area of the energy distribution lies in at least one plane perpendicular to the plane in which the beam propagation occurs, in the area of the previously unmodified substrate material, i.e. preferably on the side facing away from the preceding cavity; (ii) the partial beams of the light beam are incident only from a half of a half space or a part thereof; (iii) the light beam has a polar angle p of $0°<p<90°$ and/or the partial beams of the light beam are within an azimuth angle range of less than 180°, preferably between 85° and 100°, in particular between 90° and 95°; (iv) the partial beams of the light beam are only incident from directions which are selected so that they do not propagate through areas of the substrate body from which substrate material has already been removed and/or displaced and/or into which substrate material has been compressed; (v) the light beam has at least one mirror plane parallel to the plane in which the beam propagation occurs; (vi) the term "asymmetrical" is to be understood in the sense of "non-rotationally symmetrical", that is to say in particular that other symmetries are not excluded; and/or (vii) the partial beams of the light beam in each plane parallel to at least one surface of the substrate element and/or in each plane perpendicular to the optical axis of the light beam are incident only from one or only from two quadrants.

If the energy is supplied asymmetrically, preferably in such a way that the centroid-of-area of the energy distribution lies in the plane perpendicular to the direction of beam propagation in the area of the previously unmodified material, i.e. on the side facing away from the previous cavity, it can be particularly, effectively prevent that the line focus is influenced by already existing cavities.

As a result of the asymmetrical energy supply, i.e. the asymmetrical beam supply, it is achieved that the laser energy is no longer focused-viewed in a plane perpendicular to the optical axis-rotationally symmetrical from all directions along a focal line.

The term "(not) from all directions" therefore refers to the component in the transverse plane, i.e. in the plane perpendicular to the optical axis. The component along the optical axis always points in the direction of propagation of the laser beam.

Both Airy and Bessel beams have a pole angle p of 0°<p<90°. Here, the polar direction is defined as the direction of propagation of the laser beam's center of gravity, or the polar axis is defined as parallel to the optical axis.

In the case of the Airy beam, the interval width of the azimuth angle of the partial beams is less than 180°, for example between 90° and 95°. Or stated otherwise: viewed in polar coordinates, the azimuth angle no longer covers 360°, i.e. no longer all directions, but only a section thereof.

In preferred embodiments, there is a curved focus line. In such embodiments, the expert speaks of an "accelerated light beam".

The partial beams can extend in half a room half or in a part thereof, this ensures that the partial beams always extend in the still unprocessed material area.

It is preferred that for the asymmetrical beam supply the partial beams and their direction of incidence are viewed in a plane. The plane preferably extends perpendicular to a plane in which the beam propagation occurs.

Alternatively or additionally, it can also be provided that the light beam comprises at least one laser beam, the light beam is formed as an Airy beam or as a Bessel beam at least in the area of the line focus and/or the laser energy is focused along the focal line of the line focus.

An Airy beam is particularly well suitable for an asymmetrical/lateral beam supply. A Bessel beam is particularly well suitable for a symmetrical/radial beam supply.

An Airy beam or a Bessel beam can also be generated particularly easily and efficiently.

For example, a Gaussian beam can serve as a starting basis, which is then shaped into a Bessel beam by use of suitable optics, such as an axicon.

A Gaussian beam can be used as the output beam for an Airy beam. A cubic phase is then applied to this Gaussian beam, for example by means of a phase mask such as a DOE or SLM, or cylindrical lenses. This beam with cubic phase is then imaged, for example by use of a microscope lens. In other words, an Airy beam can be obtained as an image of a beam with a cubic phase, which is generated either directly by a phase mask (DOE or SLM) or a setup with cylindrical lenses. The Airy beam can also be generated as a Fourier transform of the cubic phase. For a development of the Fourier transformation with a plane phase, i.e. for the best possible propagation before and after the Fourier plane, the cubic phase is preferably imparted in the "front focal plane", i.e. the focal plane in front of the imaging optics. The Fourier plane corresponds to the back focal plane of the imaging optics.

Alternatively or in addition, it can also be provided that controlling of the line focus comprises that the line focus is successively formed within different local areas of the substrate material and thereby the substrate material in each of these local areas is respectively removed and/or displaced. In particular, the substrate material is compressed into a part of the substrate body surrounding the respective local area, so that preferably the individual local areas, in particular in at least one first specific cross-sectional plane of the substrate element, preferably the plane extending perpendicular to the separation face, perpendicular to the optical axis of the light beam and/or parallel to at least one first surface of the substrate element, extend along a straight path.

By selecting different local areas of the substrate material for forming the line focus, the course and the formation of the perforation holes can be determined in a targeted manner. In particular, in such a way, discrete locations within the substrate body or the substrate material can be selected at which perforation holes are to be formed.

In order to form a straight separation face, the individual local areas can be selected so that they extend along a straight path.

Here, the person skilled in the art understands that a local area of the substrate material can in principle be larger than the area that the line focus occupies in the substrate material. A local area is determined in that the substrate material is removed and/or displaced in this area by the line focus. For example, the substrate material can predominantly be displaced within the substrate body and the substrate material can predominantly be removed in the surface area of the substrate body.

Alternatively or in addition, it can also be provided that the line focus and/or the local areas is or are selected so that the greatest extension of the local areas in the first specific cross-sectional plane is between 0.2 µm and 200 µm, preferably between 0.2 µm and 100 µm, more preferably between 0.2 µm and 50 µm, even more preferably between 0.3 µm and 20 µm, even more preferably between 0.3 µm and 10 µm, and most preferably 0.7 µm.

If the extension of the local areas, and consequently the extension of the areas from which material is removed or displaced, is suitably selected, a particularly advantageous perforation line can be obtained for the subsequent separation by, for example, mechanical crushing.

As an alternative or in addition, it can also be provided that respective adjacent local areas in the first specific cross-sectional plane, in particular along the path, have a center-to-center distance from one another that corresponds between 1 and 500 times, preferably between 1 and 100 times, more preferably between 1 and 50 times, even more preferably between 1 and 10 times, more preferably between 1 and 50 times, even more preferably between 1 and 10 times, even more preferably between 1.1 and 5 times, of the greatest extension of the local areas in the first specific cross-sectional plane and/or that is between 0.1 µm and 500 µm, preferably between 0.2 µm and 400 µm, even more preferably between 0.2 µm and 200 µm, even more preferably between 0.2 µm and 100 µm, even more preferably between 0.2 µm and 50 µm, more preferably between 0.4 µm and 20 µm, even more preferably between 1 µm and 7 µm, and most preferably between 1 µm and 3 µm.

By selecting the distance between adjacent local areas depending on the extension of the local areas, a particularly small force is sufficient to separate the substrate element. This leads to particularly little additional damages to the substrate material. This, in turn, supports to achieve a particularly high strength of the separation face. Likewise, a particularly advantageous separation behavior can be achieved by specifying a distance in absolute terms.

Alternatively or in addition, it can also be provided that the controlling of the line focus comprises that the line focus is generated successively within different effective areas in the substrate element, in particular in the substrate body, and as a result the substrate material arranged within these effective areas is removed and/or displaced, in particular the substrate material is compressed into a part of the substrate body surrounding the respective effective area, and the distance of the individual effective areas is selected so that at least immediately adjacent effective areas at least partially overlap, such that a continuous corridor which is free of substrate material is formed in the substrate material along the separation face, preferably the individual effective areas, in particular in at least one second specific cross-sectional plane of the substrate element, which plane extends preferably perpendicular to the separation face, perpendicular to the optical axis of the light beam and/or parallel to at least one second surface of the substrate element, extend along a straight path.

By quasi nesting different effective areas for forming the line focus and since the entire substrate material present within the active area is respectively removed or displaced, even the direct separation of the substrate element can be achieved along the separation face. This makes the additional step of mechanical crushing dispensable.

In order to form a straight separation face, the individual effective areas can be selected in such a way that they extend along a straight path.

The "corridor" advantageously enables both inner and outer parts to be separated. This means that inner parts can also be removed from a substrate. For example, a circular opening can be removed from a (cuboid) substrate so that a hole is formed in the substrate. Depending on whether it is an inner or outer contour, mechanical crushing and/or etching can be used. Especially with inner contours mechanical crushing can usually not be used.

Here, the person skilled in the art understands that an effective area can generally be larger than the area occupied by the line focus. An effective area is determined by the fact that in this the substrate material is removed or displaced by the line focus. Accordingly, it is clear that the individual effective areas do not have to be completely filled with substrate material, but that only the substrate material that is contained therein is removed or displaced.

In one embodiment, the second specific cross-sectional plane of the substrate element is the same as the first specific cross-sectional plane of the substrate element.

In one embodiment, the second surface of the substrate element is the same as the first surface of the substrate element.

Alternatively or in addition, it can also be provided that the line focus and/or the effective areas is or are selected so that the greatest extension of the effective areas in the second specific cross-sectional plane is between 0.2 µm and 200 µm, preferably between 0.2 µm and 100 µm, more preferably between 0.2 µm and 50 µm, even more preferably between 0.3 µm and 20 µm, even more preferably between 0.3 µm and 10 µm, and most preferably 0.7 µm.

If the extension of the effective areas, that is to say that of the areas from which material is removed or displaced, is selected appropriately, the "corridor" can be driven forward through the substrate material particularly efficiently. The larger the individual effective area is selected, the lower the number of necessary nested effective areas.

As an alternative or in addition, it can also be provided that respective adjacent effective areas in the second specific cross-sectional plane, in particular along the path, have a center-to-center distance that corresponds between 0.01 times and 1.0 times, preferably between 0.01 times and 0.5 times the greatest extension of the effective areas in the second specific cross-sectional plane and/or that is between 0.002 µm and 200 µm, preferably between 0.002 µm and 100 µm, more preferably between 0.002 µm and 50 µm, even more preferably between 0.002 µm and 10 µm, even more preferably between 0.002 µm and 1 µm, and most preferably between 0.005 µm and 0.3 µm.

By selecting the distance between adjacent effective areas depending on the extension of the effective areas, the corridor can be generated in an optimized processing time. Furthermore, a particularly high strength of the separation face can be achieved in this way. Likewise, however, a particularly advantageous separation behavior can be achieved by specifying a distance in absolute terms.

Alternatively or in addition, it can also be provided that the local areas and/or effective areas extend in the substrate material at least section-wise tubular, cylindrical and/or curved, in particular crescent in at least one cross-sectional plane, and/or extend, preferably from the first or the second surface of the substrate body to the surface of the substrate body opposite the surface, through the entire thickness range of the substrate body enclosed between the two surfaces.

In preferred embodiments, the effective areas and/or local areas extend in a direction parallel to the separation face and/or perpendicular to the main extension direction of the separation face and/or the path.

In preferred embodiments, the local tangents of the effective areas and/or local areas lie in the plane that is defined by the curved line focus.

Alternatively or in addition, it can also be provided that the controlling of the line focus comprises that the substrate element is moved relative to the at least one light beam and/or to the line focus, whereby preferably the line focus can be formed, in particular successively or continuously, at least at the different local areas and/or effective areas.

The line focus can be formed in the individual local and/or effective areas in a particularly simple and reliable manner in that the substrate element is moved relative to the light beam. Thus, the devices and optics required for generating the light beam(s) do not have to be changed, although they could in principle. Thus, after each relative movement of the substrate element, the line focus can quasi be formed anew, which is located in a new local or effective area each time due to the movement of the substrate element. Alternatively, the line focus can also continuously be formed while the substrate element is moved relatively. This variant is preferably suitable for the formation of a corridor, that is to say the complete separation of the substrate element.

In preferred embodiments, the beam geometry is repositioned and/or adapted.

The person skilled in the art knows that a continuous formation of the line focus is not possible in the case of a pulsed laser, but that the line focus formed with such a laser can very well be formed "continuously at the different local and/or effective areas" within the sense of the disclosure. This then means nothing else than that the location at which the line focus is formed changes continuously.

Alternatively or in addition, it can also be provided that the light beam or beams (i) has or have a wavelength of between 300 nm and 1500 nm, in particular 343 nm, 355 nm, 515 nm, 532 nm, 1030 nm or 1064 nm, (ii) has or have a wavelength from the transparency range of the substrate material, and/or (iii) are emitted from at least one pulsed laser, in particular an ultrashort pulse laser, with a pulse duration of between 200 fs and 50 ps, preferably between 500 fs and 10 ps, a pulse number in the burst of between 1 and 10, preferably 4, a repetition rate of between 1 kHz and 4 GHz, preferably 40 MHz, and/or a pulse energy of between 80 µJ/mm and 300 µJ/mm, preferably 100-230 µJ/mm, in particular 180 µJ/mm.

The line focus can be formed in a particularly robust and reliable manner with preferred parameters of the light beam or the laser beam.

USP lasers have a high power density, which means that non-linear effects of the substrate material can be used. In particular, focus effects can be used, which enable smaller cavities.

A burst is characterized by the fact that several pulses follow consecutively within a short period of time, for example within a time window of less than 1 μs, preferably less than 0.1 us or even less than 0.01 μs, with an interval between two pulses of less than 50 ns. In general, these can also each have the same energy, in particular pulse peak power.

Alternatively or in addition, it can also be provided that the substrate element, at least while the substrate material is removed and/or displaced, is at least partially and/or section-wise surrounded by at least one fluid and/or is at least partially and/or section-wise disposed within the fluid, so that the fluid can take the place of the removed or displaced substrate material preferably the light beam comprises at least one wavelength and the fluid has a refractive index for the wavelength of the light beam which deviates by at most 30% from the refractive index of the substrate body and/or has a refractive index of between 1.2 and 2.5, in particular the fluid comprises a liquid, has a refractive index that deviates by at most 20%, 10%, 7%, 5%, 3% or 1% from the refractive index of the substrate body and/or has a refractive index of between 1.2 and 2.1, preferably between 1.3 and 1.6.

It was found that the observed increase in the crushing force to be applied with a reduced distance between the individual cavities is probably also related to the fact that the formation of one cavity could lead to a filling of the adjacent cavity, created immediately before, with substrate material. This may be the result of melted and re-solidified substrate material or of substrate material that is compressed into the substrate body (or into the wall between adjacent cavities) when the new cavity is formed and is pressed from there into the adjacent cavity.

Due to the presence of the fluid in existing cavities, these could successfully be prevented from being completely or partially filled with substrate material again when new cavities are formed in their vicinity. Since the fluid is incompressible, the existing cavity is apparently mechanically stabilized by the fluid. If a new cavity is formed in the vicinity, this effectively prevents substrate material from being pressed into the existing cavity. In other words, a counterforce is exerted on the material between the cavity being created and the previous cavity.

By preventing a new cavity from being relieved by previous cavities, moreover, an improved prestressing of the edge of the separation face was observed, as a result of which a higher edge stability is achieved. The inventors explain this effect in that because during the formation of a cavity the material is increasingly pressed into the wall surrounding the cavity instead of into adjacent cavities, a radial compressive stress is applied in the compacted wall. In the separated substrate sub-elements this then corresponds to a compressed zone, hence a compressive stress zone, parallel to the separation face.

At the same time, the inventors also found that surface effects, for example in a laser process, can be prevented or at least reduced with the use of a fluid. That is to say, the threshold intensity for a plasma ignition on the substrate surface is optimized when the surface of the substrate element is wetted with the fluid or the substrate element is located as a whole in the fluid. This results in a greater homogeneity of the cavities over the entire length.

In addition, the fluid within the cavities can help to further reduce any conceivable further influence of the line focus by adjacent cavities. The closer the refractive index of the fluid is selected to that of the substrate material, the better the results. The inventors suspect the reason for this in that with an adapted refractive index there is less or even no energy loss at the interfaces.

If a fluid is present and, for example, fills the effective areas, a refraction and/or scattering of partial beams of the light beam at the free surface of the preceding effective area or areas in the vicinity of the line focus can be significantly reduced. This allows the separation face to be realized in a much more targeted manner.

When the refractive index is equal to or close to that of the substrate material, the use of the fluid is particularly effective.

Alternatively or additionally, it can also be provided that (i) the substrate element comprises or represents a glass element, a glass ceramic element, a silicon element and/or a sapphire element and/or is formed at least section-wise in the form of a plate and/or a wafer, in particular a silicon wafer; (ii) the substrate body comprises or represents a glass body, a glass ceramic body, a silicon body and/or a sapphire body; and/or (iii) the substrate material comprises or consists of glass, glass ceramic, silicon and/or sapphire.

The object is achieved by the disclosure according to a second aspect in that a substrate sub-element is proposed, which in particular is manufactured and/or can be manufactured by a method according to the first aspect of the disclosure, comprising at least one body which comprises at least one glass material, glass ceramic material and/or silicon and has at least one side face, the side face has at least section-wise a height-modulated surface; the side face has at least section-wise a surface roughness and the variation of the surface as a result of the surface roughness is between 1 and 5 orders of magnitude less than the variation of the surface as a result of the height modulation.

The disclosure is thus based on the surprising finding that a high strength can be achieved for a side surface by artificially introducing quasi a small unevenness. The inventors have recognized that a height modulation obviously leads to a stabilization of the side surface and thus also to a higher edge strength.

The inventors explain this positive property with the fact that due to the height modulation positive stress properties occur in the body, which contribute to an overall higher strength.

The person skilled in the art understands that in preferred embodiments the height or modulation of the surface can extend along a direction which is perpendicular to the main extension direction of the surface.

Alternatively or in addition, it can also be provided that the height modulation of the surface represents a wavelike surface and/or the variation of the surface as a result of the height modulation is within a predeterminable value range, in particular within a value range from 0.5 μm to 100 μm, preferably within a value range of 0.5 μm to 50 μm.

If the height modulation of the surface leads to a waviness of the surface, particularly high strength values can be achieved there.

Preferred ranges of values lead to preferably high strengths. It goes without saying that variation describes the difference between the maximum and minimum value of the height.

Alternatively or in addition, it can also be provided that (i) the side face at least section-wise has a, preferably average, roughness depth RZ of between 0.01 μm to 30 μm, preferably between 0.05 μm to 10 μm, most preferably between 0.05 μm to 5 μm, (ii) the surface roughness is an average surface roughness, (iii) the variation of the surface as a result of the roughness depth is between 1 and 5, preferably 2 or 3, orders of magnitude less than the variation of the surface as a result of the height modulation and/or (iv) the variation of the surface as a result of the surface roughness is 2 or 3 orders of magnitude less than the variation of the surface as a result of the height modulation.

Parallel to the height modulation, a lowest possible surface roughness or roughness depth has proven to be particularly advantageous for high strengths and thus leads to a particularly stable and therefore easy to use substrate sub-element.

It is clear that surface roughness and height modulation reside on different scales, particularly with a difference of between 1 and 5 orders of magnitude.

Alternatively or in addition, it can also be provided that the side face is at least section-wise prestressed and/or along the side face the edge strength of the substrate sub-element, in particular of the body, is greater than 100 MPa, preferably greater than 150 MPa, and/or is variable or constant over the entire side face.

Alternatively or in addition, it can also be provided that the side face, in particular on a macroscopic scale, is flat and/or curved, in particular has, preferably in at least one cross-sectional plane perpendicular to the side face, at least section-wise a parabolic and/or circular course and/or a course according to an equation of the fourth degree.

In the case of a curved side surface, forces acting on this can be diverted particularly advantageously and the stability of the side surface can thus be increased.

Examples

Figure 2A:
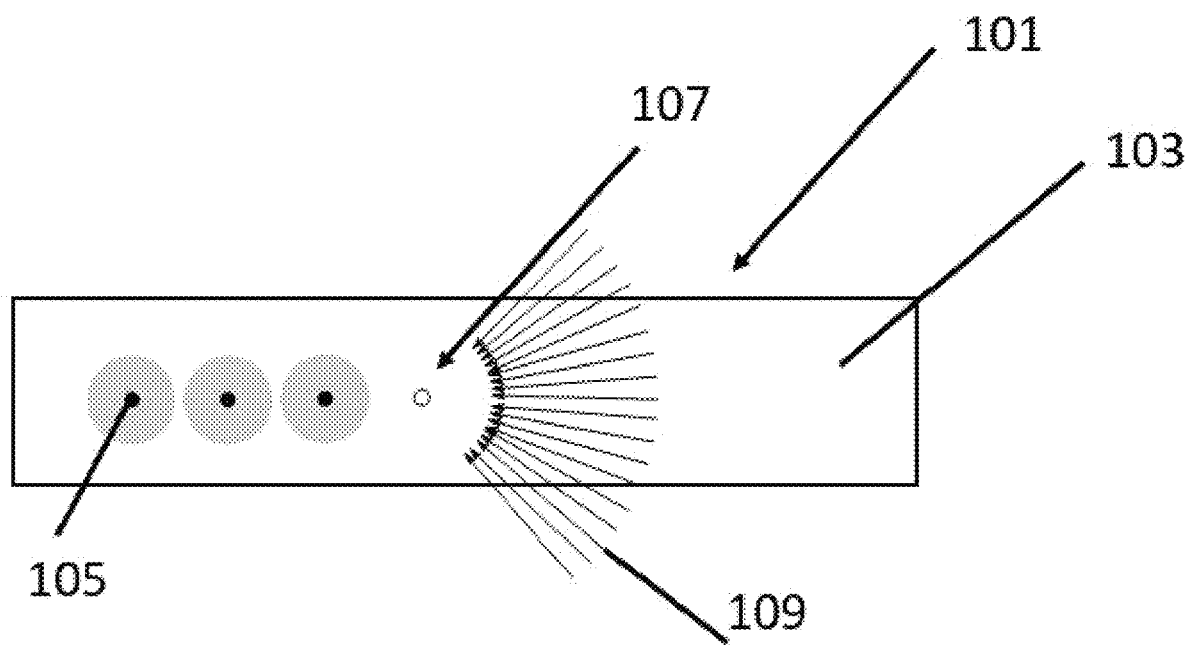
FIG. 2a shows a first substrate element in a plan view.

FIG. 2a shows a rectangular, disk-shaped first substrate element 101, for example a glass element, in a plan view. The first substrate element 101 comprises a substrate body 103, for example a glass body, which comprises a substrate material, for example glass.

Figure 2B:
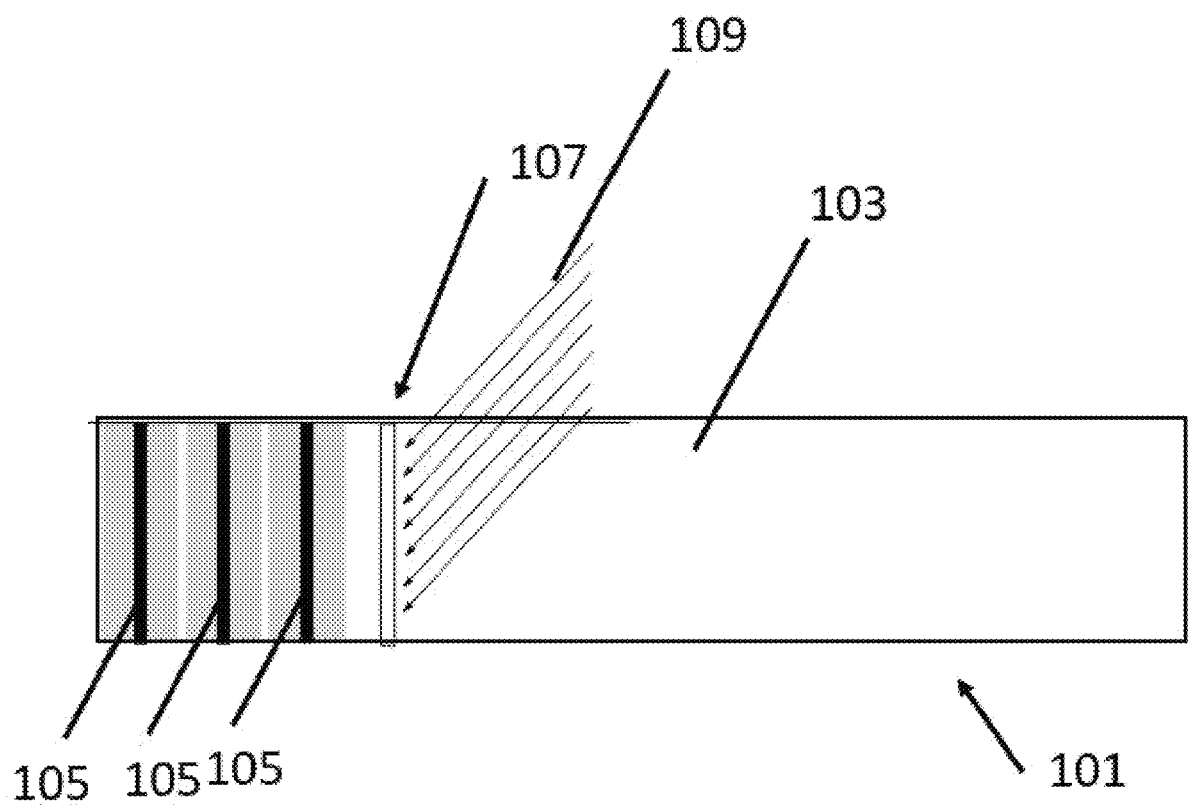
FIG. 2b shows the first substrate element in a cross-sectional view.

FIG. 2b shows the first substrate element 101 in a cross-sectional view extending perpendicular to the plan view of FIG. 2a.

In order to prepare the first substrate element 101 to be able to separate it along a separation face which lies in the plane of the drawing in FIG. 2b and which extends through the center points of the circular cavities 105, in the method according to the disclosure it is provided to control a line focus 107 within the substrate body 103 in such a way that substrate material of the substrate body 103 is locally removed and/or displaced locally section-wise along the defined separation face. For this purpose, the line focus 107 is formed successively within different local areas of the substrate material and the substrate material of these local areas is thereby respectively removed or displaced. The local area corresponds to the area of the cavities 105 in the previous substrate material. Modifications, in particular damages, of the substrate body 103 can occur around the cavities 105, however, without material being removed or displaced. For example, these can be changes in the refractive index.

Adjacent local areas have a center-to-center distance from one another in the plane of the drawing in FIG. 2a, which is greater than the greatest extension of the local areas in the plane of the drawing.

The line focus 107 is thus formed by a laser beam, which in turn is formed in the area of the line focus in the form of a light beam with an asymmetrical beam supply. With this asymmetrical beam supply, the partial beams 109 of the light beam are only incident from directions that are selected so that they do not propagate through areas of the substrate body 103 from which substrate material has already been removed and/or displaced and/or into which the substrate material has been compressed. In other words, in FIG. 2a and FIG. 2b, the partial beams 109 are only incident from the right, since the perforation holes are formed from left to right.

The laser beam has a wavelength of 1030 nm, which is in the transparency range of the substrate body 103, and is generated by an ultrashort pulse laser. The ultrashort pulse laser has a pulse length of 1 ps.

In one embodiment, while the substrate material is being removed or displaced, the first substrate element 101 could be surrounded by a fluid (not shown in FIGS. 2a and 2b) so that the fluid can take the place of the removed or displaced substrate material. This means that as soon as the substrate material is removed or displaced, the fluid can already take its place. As a result, the cavities 105 shown in FIGS. 2a and 2b would then also be completely filled with the fluid.

In the present disclosure, the asymmetrical beam supply is therefore particularly advantageous. This is particularly evident in the presence of large-area lateral disturbances and/or differences in the refractive index. The asymmetrical beam supply enables that partial beams of the light beam that forms the focus are not influenced or are only influenced a little by such disturbances or differences in the refractive index.

The present disclosure can, for example, advantageously be used to remove and/or displace material of a substrate element near a transition between two refractive indices.

With reference to FIGS. 3a, 3b, 4a and 4b, the advantages of the proposed method compared to conventional implementations are explained by considering different configurations of the light beam in different scenarios.

Figure 3A:
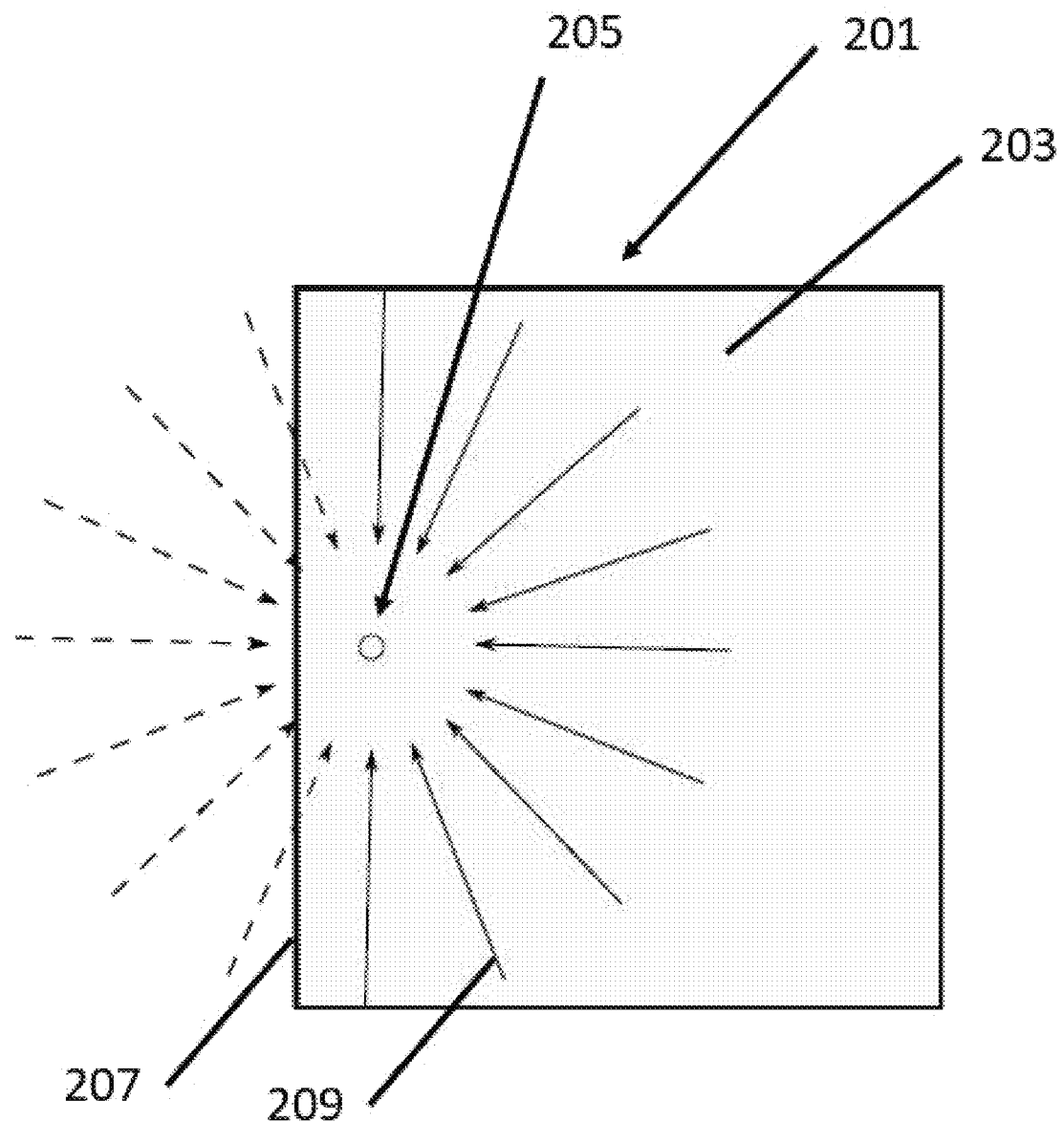
FIG. 3a shows a second substrate element in a plan view with a light beam in a first configuration according to the prior art.
Figure 3B:
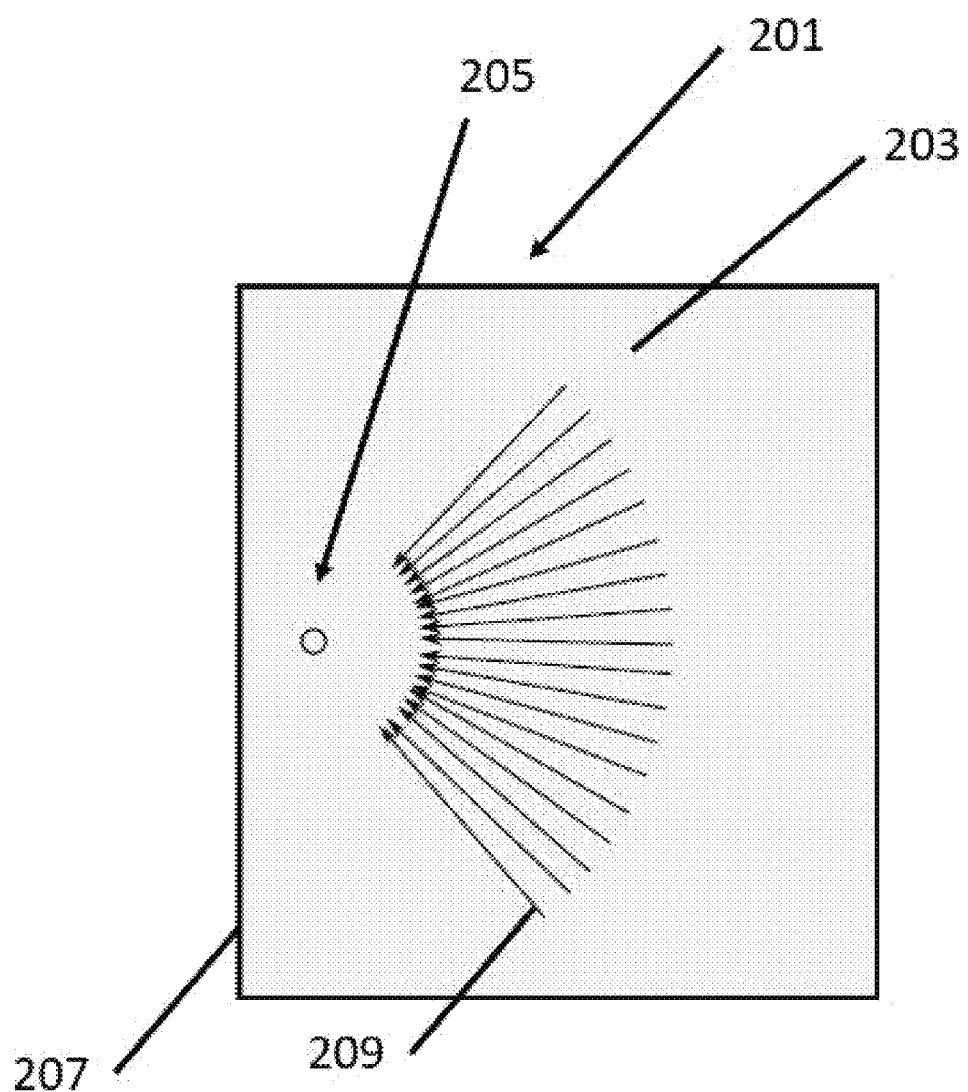
FIG. 3b shows the second substrate element in a plan view with a light beam in a second configuration.

For this purpose, FIGS. 3a and 3b show an identical second substrate element 201 in a plan view. The second substrate element 201 comprises a substrate body 203, for example a glass body, which comprises a substrate material, for example glass.

The substrate material of the substrate body 203 is to be locally removed and/or displaced, for example in order to prepare a separation of the substrate element 201. For this purpose, a line focus 205 is formed within the glass material by use of a light beam in order to form a cavity in the substrate material. The line focus 205 extends perpendicular to the plane of the drawing in FIGS. 3a and 3b and is located near an edge 207 of the substrate element 201.

The edge 207 represents a transition between two refractive indices (in FIGS. 3a and 3b from that of the substrate material to that of the medium surrounding the substrate element 201).

In FIG. 3a, the light beam is in a first configuration which comprises a conventional beam supply of the line focus 205 according to the prior art. Here, the line focus 205 is formed by partial beams 209 which (in the plane of the drawing in FIG. 3a) are incident from all directions. Some partial beams, namely those shown in dashed lines in FIG. 3a, thus extend at least partially outside of the substrate element 201. As a result of the change in the refractive index at the edge 207, this can make the formation of the focus 205 more difficult or even prevent it completely.

Here, the term "from all directions" refers to the component in the transverse plane, i.e. in the plane perpendicular to the optical axis. The component along the optical axis always points in the direction of propagation of the laser beam. Or in other words: viewed in polar coordinates, the azimuth angle covers 360°, i.e. all directions, and the polar angle moves within the focusing cone specified by the axicon as the maximum extension.

In FIG. 3b, the light beam is in a second configuration comprising an asymmetrical beam supply according to the disclosure. The line focus 205 is formed by partial beams 209 which (in the plane of the drawing in FIG. 3b) are incident only from certain directions. Here, the partial beams 209 for the situation shown in FIG. 3b extend completely within the substrate element 201. This supports the formation of the focus 205 in a particularly effective manner. The asymmetrical beam supply thus enables a stable focus to be developed in the vicinity of the edge 207.

The present disclosure can, for example, also advantageously be used to remove and/or displace material of a substrate element near large-area lateral disturbances.

Figure 4A:
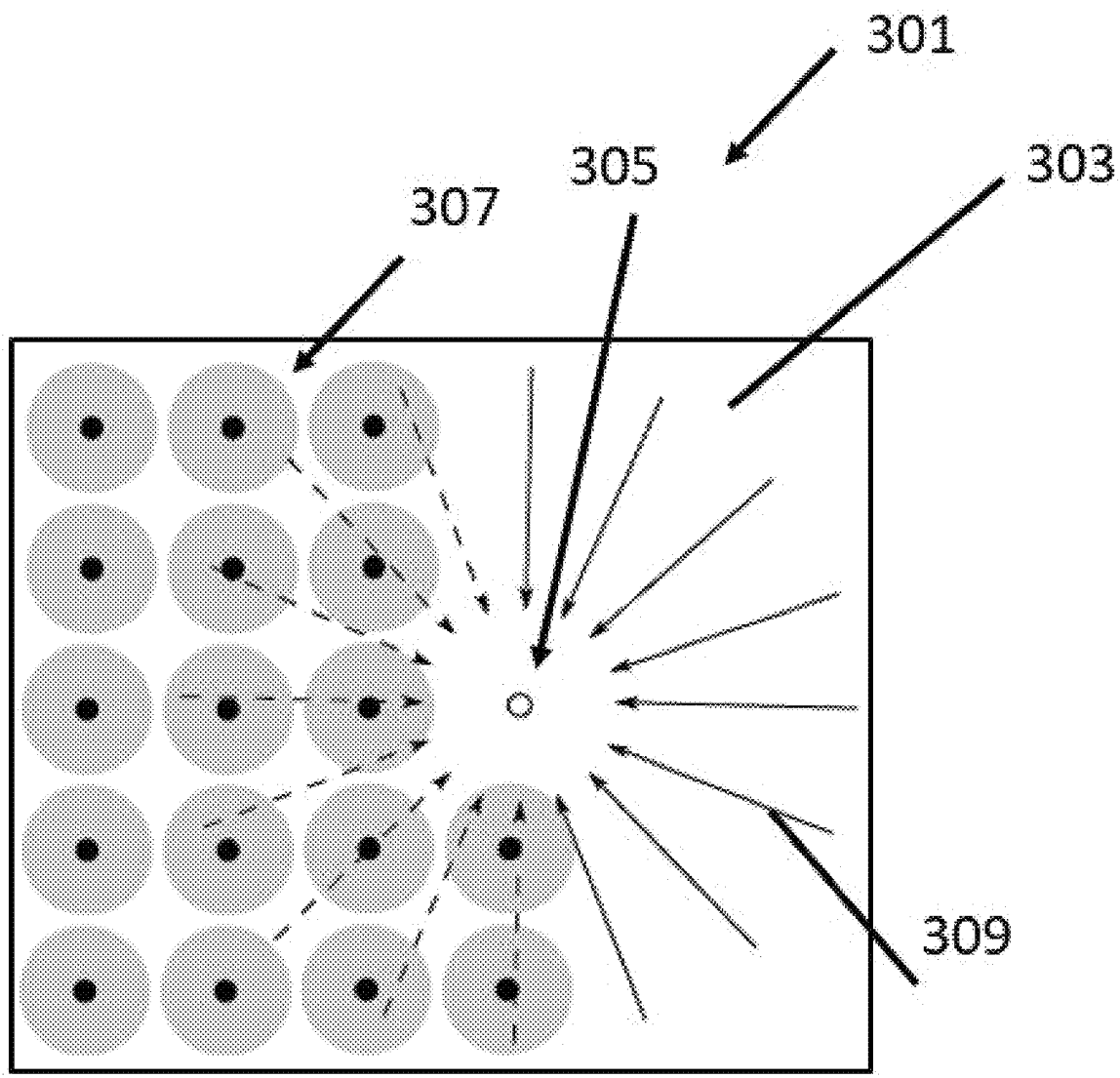
FIG. 4a shows a third substrate element in a plan view with a light beam in a third configuration according to the prior art.
Figure 4B:
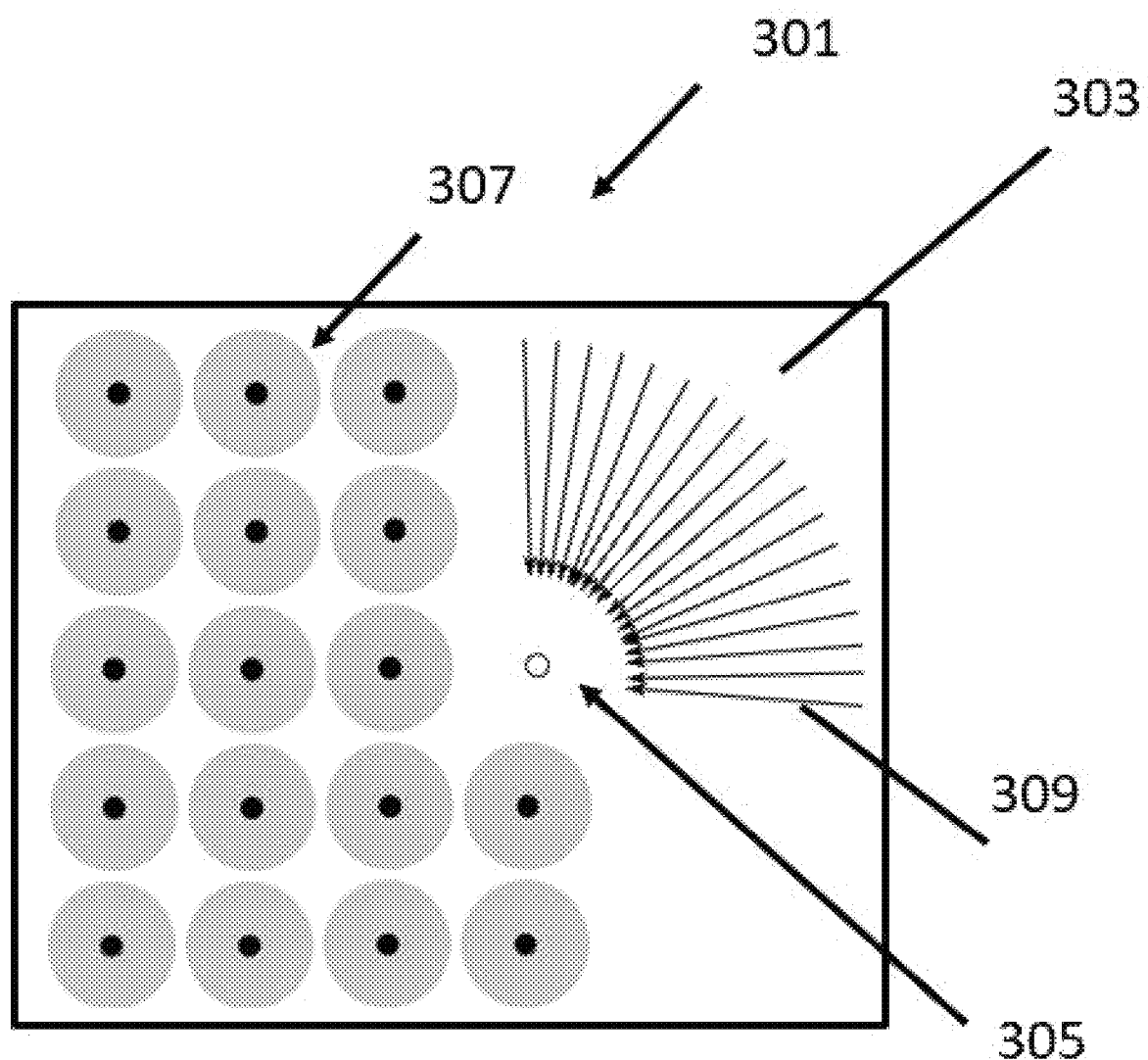
FIG. 4b shows the third substrate element in a plan view with a light beam in a fourth configuration.

FIGS. 4a and 4b show an identical third substrate element 301 in a plan view. The third substrate element 301 comprises a substrate body 303, for example a glass body, which comprises a substrate material, for example glass.

The substrate material of the substrate body 303 is to be locally removed and/or displaced. For this purpose, a line focus 305 is formed within the glass material by use of a light beam in order to form a cavity in the substrate material. The line focus 305 extends perpendicular to the plane of the drawing in FIGS. 4a and 4b and is located near disturbances 307 of the substrate element 301. Here, the disturbances 307 represent several modifications introduced in the substrate body 303 in the form of, for example, changes in the refractive index and/or removed glass material.

In FIG. 4a, the light beam is shown in a third configuration which comprises a conventional beam supply of the line focus 305 according to the prior art. The line focus 305 is formed by partial beams 309 which (in the plane of the drawing in FIG. 4a) are incident from all directions. Some partial beams, namely those shown in FIG. 4a with dashed lines, thus propagate at least partially through the disturbances 307. This can make the formation of the focus 305 more difficult or even prevent it entirely.

In FIG. 4b, the light beam is shown in a fourth configuration which comprises an asymmetrical beam supply according to the disclosure. Here, the line focus 305 is formed by partial beams 309 which (in the plane of the drawing in FIG. 4b) are incident only from certain directions. In the plane of the drawing in FIG. 4b, the partial beams therefore propagate only in the upper right quadrant. The partial beams 309 propagate in such a way that they do not propagate through the disturbances 307. This supports the formation of the focus 305 in a particularly effective manner. The asymmetrical beam supply therefore enables a stable focus to be developed in the vicinity of the disturbances 307.

In particular, with many, densely placed disturbances 307, such as the modifications mentioned, the influence of the partial beams 309, in particular in the form of shadowing, is very significant. Accordingly, the asymmetrical beam supply is particularly advantageous in this case. A special case of this application is the intersection, in particular a T-intersection, of two lines. Or in other words, the intersection of modifications that extend along two lines. The disclosure can also preferably be used for this purpose by appropriately selecting the beam supply.

The first and third configurations therefore each show a light beam as is used in the prior art, with the associated disadvantages. The disadvantages can be overcome with one light beam by selecting a configuration according to the disclosure therefor, that is to say the second and fourth configurations, for example.

Figure 5A:
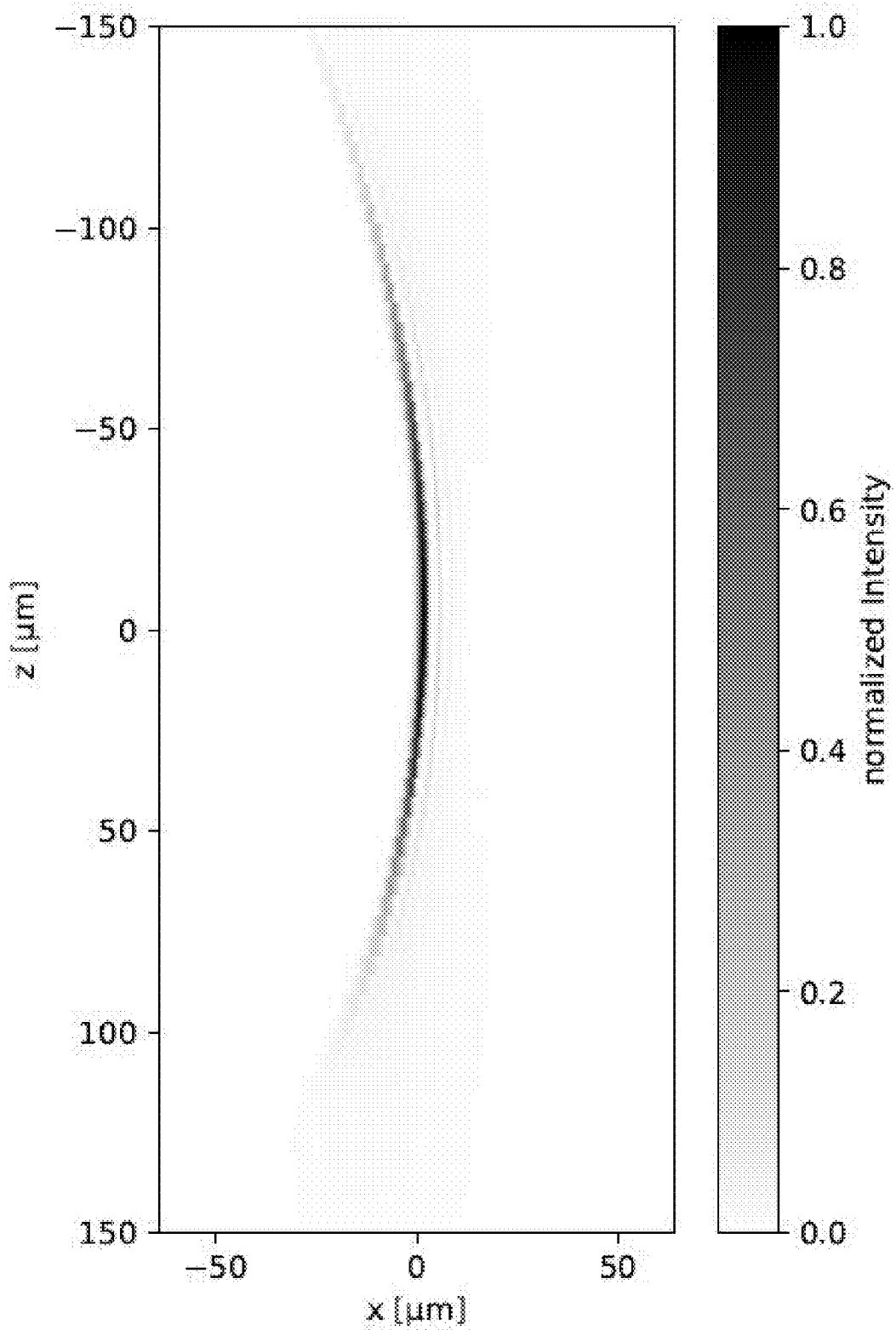
FIG. 5a shows a first cross-sectional view of a ray tracing model of an Airy beam in a first cross-sectional plane.

FIG. 5a shows a first cross-sectional view of a ray tracing model of an Airy beam in a first cross-sectional plane. The first cross-sectional plane extends parallel to the separation face of a hypothetical (e.g. cuboid) substrate element. This means that the separation face lies in the x-z plane (at y=0) and intersects the complete, curved line focus. In FIG. 5a, the line focus has its maximum intensity in its center, that is to say in the area around (x=0; z=0). Corresponding to the curved line focus, the local or effective areas also extend equally curved. In the case of the method according to the disclosure, adjacent local or effective areas follow consecutively in the positive x-direction.

Figure 5B:
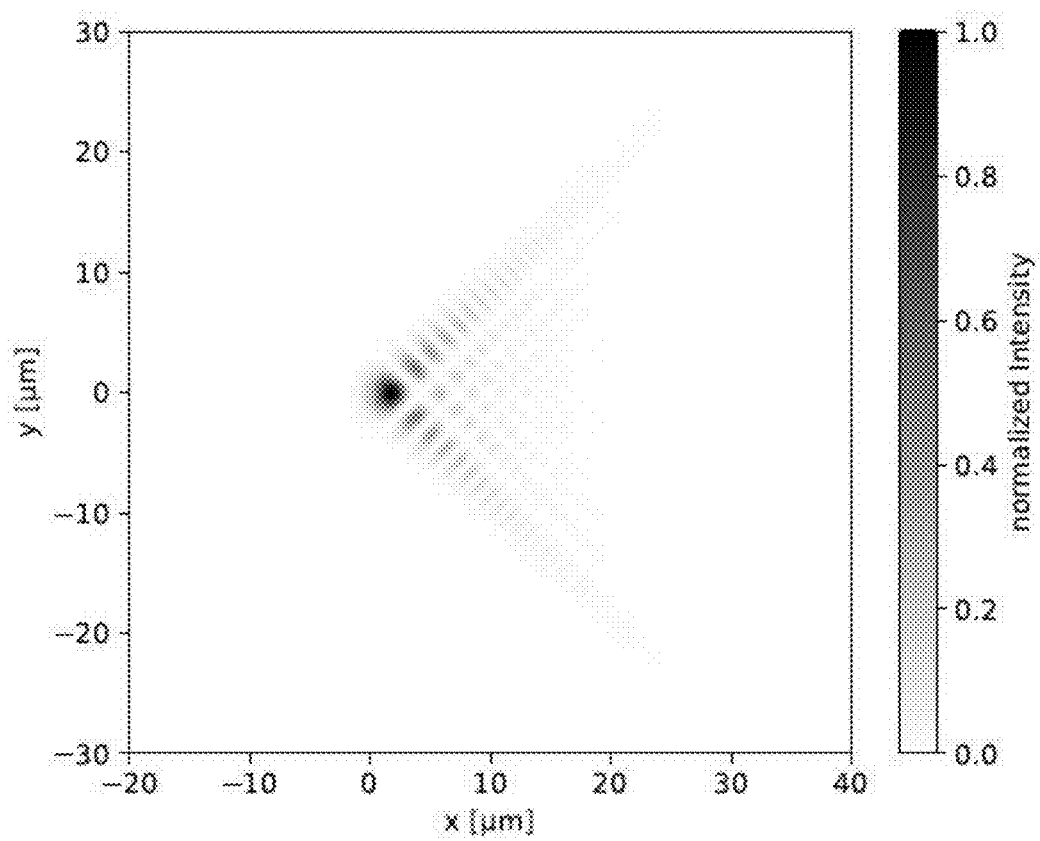
FIG. 5b shows a second cross-sectional view of the ray tracing model of the Airy beam in a second cross-sectional plane.

FIG. 5b shows a second cross-sectional view of the ray tracing model of the Airy beam in a second cross-sectional plane. The second cross-sectional plane is perpendicular to the first cross-sectional plane. For example, this could be the surface of the hypothetical (cuboid) substrate element, or a plane extending parallel thereto within the substrate element. In the method according to the disclosure, adjacent local/effective areas follow consecutively in the positive x-direction. The second cross-sectional plane shown in FIG. 5b could for example be a first and/or a second specific cross-sectional plane according to the disclosure. It is conceivable that both the first and the second specific cross-sectional planes correspond to the second cross-sectional plane shown in FIG. 5b. For example, it could be required that adjacent local or effective areas in the first or second specific cross-sectional plane, i.e. in the second cross-sectional plane of FIG. 5b, have a certain center-to-center distance from each other.

The cross-sectional plane of FIG. 5b intersects the line focus of the laser beam in the area around the point (x=0; y=0). In the area of positive x values, moreover, the lateral partial beams of the laser beam can be seen. As can also be seen from FIG. 5b, the Airy beam there has no lateral components towards negative x values. Instead, the beam supply occurs asymmetrically in accordance with the method according to the disclosure, that is to say only from parts of the half-space with positive x values in the situation in FIG. 5b. As a result, when the line focus is relatively shifted in the direction of the positive x-axis, no partial beams occur in the area of previous cavities.

As already mentioned, in connection with the beam supply or energy supply, the term "asymmetrical" is understood in the present case in the sense of "non-rotationally symmetrical". This means that other symmetries are not excluded. For example, the Airy beam described herein has a mirror plane parallel to the x-z plane, as can be seen from FIG. 5b.

The features disclosed in the preceding description, in the claims and in the drawings, both individually and in any combination, can be essential for the disclosure in its various embodiments.

LIST OF REFERENCE SYMBOLS 1 substrate element
3 substrate body
5 cavity
7 focus
9 partial beam
101 substrate element
103 substrate body
105 cavity
107 focus
109 partial beam
201 substrate element
203 substrate body
205 focus
207 edge
209 partial beam 301 substrate element
303 substrate body
305 focus
307 disturbances
309 partial beam

What is claimed is:

1. A method for preparing and/or performing the separation of a substrate element into at least two substrate sub-elements along a separation face, comprising the steps of:
   providing the substrate element, wherein the substrate element comprises a substrate body, and wherein the substrate body comprises a substrate material; and
   controlling a line focus within the substrate body so that the substrate material of the substrate body is at least locally removed and/or displaced along the separation face at least section-wise,
   wherein the controlling comprises successively generating the line focus within different effective areas in the substrate element so that the substrate material within the effective areas is removed and/or displaced, and wherein the effective areas extend in the substrate to form an at least section-wise curved volume;
   wherein the line focus represents a focus of a light beam;
   wherein the light beam is formed at least in the area of the line focus in the form of a light beam with an asymmetrical beam supply;
   wherein the asymmetrical beam supply supplies energy asymmetrically so that the centroid-of-area of the energy distribution lies in at least one plane perpendicular to the plane in which the beam propagation occurs in the area of the previously unmodified substrate material; and
   wherein partial beams of the light beam are only incident from directions that do not propagate through areas of the substrate body from which substrate material has already been removed and/or displaced and/or into which substrate material has been compressed.

2. The method according to claim 1,
   wherein at least one of the following conditions applies to the asymmetrical beam supply:
   (i) partial beams of the light beam are incident only from a half of a half space or a part thereof;
   (ii) the light beam has a polar angle p of 0°<p<90° and/or the partial beams of the light beam are within an azimuth angle range of less than 180°;
   (iii) the light beam has at least one mirror plane parallel to the plane in which the beam propagation occurs;
   (iv) the asymmetrical beam supply is non-rotationally symmetrical, and other symmetries are not excluded; and
   (v) the partial beams of the light beam in each plane parallel to at least one surface of the substrate element and/or in each plane perpendicular to the optical axis of the light beam are incident only from one or only from two quadrants.

3. The method according to claim 1,
   wherein the light beam is formed as an Airy beam.

4. The method according to claim 1,
   wherein the controlling of the line focus step comprises successively forming the line focus within different local areas of the substrate material, so that the substrate material in each of these local areas is removed and/or displaced.

5. The method according to claim 4,
   wherein in at least one first specific cross-sectional plane of the substrate element, the individual local areas are selected such that the greatest extension of the local areas in the first specific cross-sectional plane is between 0.2 µm and 200 µm.

6. The method according to claim 5,
   wherein adjacent local areas in the first specific cross-sectional plane have a center-to-center distance from one another that is between 1 and 500 times of the greatest extension of the local areas in the first specific cross-sectional plane, and/or that the center-to-center distance is between 0.1 µm and 500 µm.

7. The method according to claim 1,
   wherein the different effective areas are generated so that at least immediately adjacent effective areas at least partially overlap and a continuous corridor which is free of substrate material is formed in the substrate material along the separation face.

8. The method according to claim 7,
   wherein the line focus and/or the individual effective areas is or are such that the greatest extension of the effective areas in a second specific cross-sectional plane is between 0.2 µm and 200 µm.

9. The method according to claim 8,
   wherein adjacent effective areas in the second specific cross-sectional plane have a center-to-center distance that is between 0.01 times and 1.0 times the greatest extension of the effective areas in the second specific cross-sectional plane, and/or the center-to-center distance is between 0.002 µm and 200 µm.

10. The method according to claim 7,
    wherein the different effective areas extend through the entire thickness range of the substrate body enclosed between the two surfaces.

11. The method according to claim 7,
    wherein the controlling of the line focus step comprises moving the substrate element relative to the light beam and/or to the line focus, thereby forming the line focus at least at the different local areas and/or effective areas.

12. The method according to claim 1,
    wherein the light beam has at least one of the following characteristics: (i) a wavelength of between 300 nm and 1500 nm, (ii) a wavelength from the transparency range of the substrate material, and/or (iii) is emitted from at least one pulsed laser with a pulse duration of between 200 fs and 50 ps, a pulse number in the burst of between 1 and 10, a repetition rate of between 1 KHz and 4 GHZ, and/or a pulse energy of between 80 µJ/mm and 300 µJ/mm.

13. The method according to claim 1,
    wherein the substrate element, at least while the substrate material is removed and/or displaced, is at least partially and/or section-wise surrounded by at least one fluid, and/or is at least partially and/or section-wise disposed within the fluid, so that the fluid can take the place of the removed or displaced substrate material, wherein the light beam comprises at least one wavelength and the fluid has a refractive index for the wavelength of the light beam that deviates by at most 30% from the refractive index of the substrate body and/or has a refractive index of between 1.2 and 2.5.

14. The method according to claim 1,
    wherein at least one of the following conditions applies:
    (i) the substrate element comprises a glass element, a glass ceramic element, a silicon element and/or a sapphire element, and/or is formed at least section-wise as a plate and/or a wafer;
    (ii) the substrate body comprises a glass body, a glass ceramic body, a silicon body and/or a sapphire body;

and
(iii) the substrate material consists of glass, glass ceramic, silicon and/or sapphire.

15. The method according to claim 1, wherein the asymmetrical beam supply supplies energy asymmetrically and so that the centroid-of-area of the energy distribution lies in at least one plane perpendicular to the plane in which the beam propagation occurs in the area of the previously unmodified substrate material.

16. The method according to claim 1, wherein partial beams of the light beam are only incident from directions that do not propagate through areas of the substrate body from which substrate material has already been removed and/or displaced and/or into which substrate material has been compressed.

17. The method according to claim 1, wherein the light beam is formed at least in the area of the line focus in the form of a light beam with the asymmetrical beam supply that is configured so that partial beams of the light beam are incident only from a half-space facing the previously unmodified substrate material, thereby avoiding propagation through cavities or compressed regions that have already been formed.

18. A substrate sub-element prepared according to the method in claim 1 of separation of a substrate element into at least two substrate sub-elements along a separation face, comprising at least one body which comprises at least one glass material, glass ceramic material, and/or silicon, and has at least one side face, wherein the side face has at least section-wise a height-modulated surface; wherein the side face has at least section-wise a surface roughness and a variation of the surface as a result of the surface roughness is between 1 and 5 orders of magnitude less than a variation of the surface as a result of the height modulation.

19. The substrate sub-element according to claim 18, wherein the height modulation of the surface represents a wavelike surface and/or the variation of the surface as a result of the height modulation is within a value range of from 0.5 μm to 100 μm.

20. The substrate sub-element according to claim 18, wherein (i) the side face at least section-wise has a, roughness depth RZ of between 0.01 μm to 30 μm, (ii) the surface roughness is an average surface roughness, (iii) the variation of the surface as a result of the roughness depth is between 1 and 5 orders of magnitude less than the variation of the surface as a result of the height modulation, and/or (iv) the variation of the surface as a result of the surface roughness is 2 or 3 orders of magnitude less than the variation of the surface as a result of the height modulation.

21. The substrate sub-element according to claim 18, wherein the side face is at least section-wise prestressed, and/or along the side face the edge strength of the substrate sub-element is greater than 100 MPa, and/or along the side face the edge strength of the substrate sub-element is variable or constant over the entire side face.

22. The substrate sub-element according to claim 18, wherein the side face is flat and/or curved.

23. The substrate sub-element according to claim 18, wherein the side face has at least section-wise a parabolic and/or circular course and/or a course according to an equation of the fourth degree.

\* \* \* \* \*